US012206154B2

(12) United States Patent
Sarkar et al.

(10) Patent No.: US 12,206,154 B2
(45) **Date of Patent: *Jan. 21, 2025**

(54) COMPACT HIGH-DIRECTIVITY DIRECTIONAL COUPLER STRUCTURE USING INTERDIGITATED COUPLED LINES

(71) Applicant: Samsung Electronics Co., Ltd., Gyeonggi-do (KR)

(72) Inventors: Anirban Sarkar, San Jose, CA (US); Tienyu Chang, Sunnyvale, CA (US); Siuchuang Ivan Lu, San Jose, CA (US); Sang Won Son, Palo Alto, CA (US)

(73) Assignee: Samsung Electronics Co., Ltd (KR)

( * ) Notice: Subject to any disclaimer, the term of this patent is extended or adjusted under 35 U.S.C. 154(b) by 38 days.

This patent is subject to a terminal disclaimer.

(21) Appl. No.: 18/115,327

(22) Filed: Feb. 28, 2023

(65) Prior Publication Data

US 2023/0208005 A1 Jun. 29, 2023

Related U.S. Application Data

(63) Continuation of application No. 17/462,580, filed on Aug. 31, 2021, now Pat. No. 11,621,470.

(60) Provisional application No. 63/144,730, filed on Feb. 2, 2021.

(51) Int. Cl.
*H01P 5/18* (2006.01)
*H01P 1/18* (2006.01)
*H01Q 23/00* (2006.01)

(52) U.S. Cl.
CPC ................ *H01P 5/187* (2013.01); *H01P 1/18* (2013.01); *H01P 5/186* (2013.01); *H01Q 23/00* (2013.01)

(58) Field of Classification Search
CPC .. H01P 5/18; H01P 5/185; H01P 5/186; H01P 5/187; H01Q 1/241; H01Q 1/2291; H01Q 23/00; H01Q 21/24
See application file for complete search history.

(56) References Cited

U.S. PATENT DOCUMENTS 7,187,250 B2 3/2007 Matters-Kammerer
8,249,544 B2 8/2012 Okabe
8,289,102 B2 10/2012 Yamamoto et al.
(Continued)

FOREIGN PATENT DOCUMENTS

CN 103748739 11/2016

OTHER PUBLICATIONS

Cao et al., A Glass Transfer Plate Integrated Waveguide based on Quasi TEM Mode and Manufacturing Method, 2016.

*Primary Examiner* — Thai Pham
(74) *Attorney, Agent, or Firm* — The Farrell Law Firm, P.C.

(57) ABSTRACT

Disclosed is a device including a first line, a second line including a first section disposed on a first side of the first line and a second section disposed on a second side of the first line, the second side being opposite to the first side and the second section being separate from the first section by a distance, and at least one bridge electrically connecting an end of the first section with an end of the second section and extending across the first line. The device may be a directional coupler that achieves significantly higher directivity than conventional directional coupler structures, and hence, improves power detection accuracy.

18 Claims, 8 Drawing Sheets

(56) References Cited

U.S. PATENT DOCUMENTS

| | | | | |
|---|---|---|---|---|
| 8,330,552 | B2 | 12/2012 | Li | |
| 8,773,217 | B2 | 7/2014 | Dupont | |
| 9,553,349 | B2 | 1/2017 | Mukaiyama | |
| 9,570,793 | B2 | 2/2017 | Borodulin | |
| 9,947,985 | B2 | 4/2018 | Solomko et al. | |
| 10,056,988 | B2 | 8/2018 | Wu | |
| 10,187,029 | B1 | 1/2019 | Tabatabai | |
| 10,418,755 | B2 | 9/2019 | Kahlman | |
| 10,826,152 | B2 | 11/2020 | Messina | |
| 11,374,300 | B2 * | 6/2022 | Park | H01P 5/184 |
| 2013/0207741 | A1 | 8/2013 | Presti | |
| 2016/0268668 | A1 * | 9/2016 | Mitake | H04B 1/16 |
| 2019/0067784 | A1 * | 2/2019 | Yasuda | H01P 5/185 |
| 2021/0098854 | A1 * | 4/2021 | Tokuda | H01P 5/187 |

* cited by examiner

300

COMPACT HIGH-DIRECTIVITY DIRECTIONAL COUPLER STRUCTURE USING INTERDIGITATED COUPLED LINES

PRIORITY

This application is a continuation of U.S. application Ser. No. 17/462,580, which was filed in the U.S. Patent and Trademark Office (USPTO) on Aug. 31, 2021, and claims priority under 35 U.S.C. § 119(e) to U.S. Provisional Application Ser. No. 63/144,730, which was filed in the USPTO on Feb. 2, 2021, the entire content of each of which is incorporated herein by reference.

BACKGROUND

1. Field

The disclosure relates generally to couplers, and more particularly, to a passive structure for four-port directional couplers.

2. Description of Related Art

Performance of cellular handset transmitters, especially $5^{th}$ Generation (5G) transmitters, shows strong dependence on antenna voltage standing wave ratio (VSWR). To calibrate the transmitter against antenna VSWR degradation, accurate detection of the transmitter output power is required.

A directional coupler between the transmitter and the antenna may be used in conjunction with power detectors to detect the power in forward and reverse waves. For high accuracy of power detection with degraded antenna VSWR, the directivity of the directional coupler should be as high as possible.

The length of the conventional coupler is generally long (at least ¼) and causes high insertion loss (about 1 decibel (dB)), resulting in the conventional coupler occupying a large amount of chip area. Therefore, there is a need in the art for a coupler that consumes less chip area and achieves higher directivity and better performance than in the conventional art.

SUMMARY

The present disclosure has been made to address at least the above-mentioned problems and/or disadvantages and to provide at least the advantages described below.

Accordingly, an aspect of the present disclosure is to provide a passive structure for compact (length $<<\lambda/4$) directional couplers, which achieves significantly higher directivity than conventional directional coupler structures, and hence, improves power detection accuracy. The high directivity is possible due to the flexibility allowed by the structure in adjusting coupled-transmission line parameters.

In accordance with an aspect of the disclosure, a device includes a first line, a second line including a first section disposed on a first side of the first line and a second section disposed on a second side of the first line, the second side being opposite to the first side and the second section being separate from the first section by a distance, and at least one bridge electrically connecting an end of the first section with an end of the second section and extending across the first line.

In accordance with another aspect of the disclosure, an electronic device includes an antenna, and a directional coupler electrically connected to the antenna, the directional coupler including a first line, a second line including a first section disposed above the first line and a second section disposed beneath the first line, the second section being separate from the first section by a distance, and at least one bridge electrically connecting an end of the first section with an end of the second section by extending above or below the first line.

In accordance with another aspect of the disclosure, a device includes a transmitter, an antenna, a first line, a second line including a first section disposed on a first side of the first line and a second section disposed on a second side of the first line, the second side being opposite to the first side and the second section being separate from the first section by a distance, and at least one bridge electrically connecting an end of the first section with an end of the second section, wherein the first line, the second line, and the at least one bridge are electrically connected to the transmitter on a first end and to the antenna by a via on a second end opposite to the first end.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
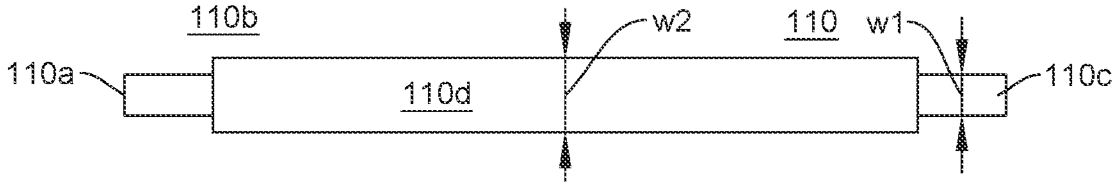
FIG. 1A (RELATED ART)
FIG. 1A illustrates a vertically coupled structure, according to the prior art.

Embodiments of the present disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the disclosure, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

To achieve ideal directivity with a given coupling factor C, the S-parameter matrix of a four-port directional coupler should be as follows:

$$\begin{bmatrix} 0 & \sqrt{(1-C^2)} & jC & 0 \\ \sqrt{(1-C^2)} & 0 & 0 & jC \\ jC & 0 & 0 & \sqrt{(1-C^2)} \\ 0 & jC & \sqrt{(1-C^2)} & 0 \end{bmatrix}$$

The desired reflection coefficients ($S_{11}$, $S_{22}$, $S_{33}$ and $S_{44}$) can be achieved using 50-Ω resistive terminations or suitable matching networks. The present disclosure provides a coupler structure that achieves transmission coefficients ($S_{21}$, $S_{31}$, and $S_{41}$) as close as possible to that of an ideal coupler. Further, the desired values of $S_{31}$ (jC) and $S_{41}$ (0) are targeted in the present disclosure because passivity constraints ($|S_{11}|^2+|S_{21}|^2+|S_{31}|^2+|S_{41}|^2=1$) enable independent selection of only three out of the four parameters $S_{11}$, $S_{21}$, $S_{31}$, and $S_{41}$.

These S-parameter constraints, $S_{31}$=jC and $S_{41}$=0 can be translated to equations involving coupled line parameters using the forgoing theory, and as such, Equations [1], [2] and [3] appear as follows:

$$\frac{jk\sin\theta}{\sqrt{1-k^2}} = jC \quad [1]$$

-continued $$L = \frac{2Z_0^2 C_s}{1-k} \quad [2]$$

$$C_s = \frac{(1-k)C_m}{k}, \quad [3]$$

In Equations [1], [2] and [3], θ is the electrical length of the lines, L is the self-inductance of the lines, k is the magnetic coupling factor between the lines, $C_s$ is the self-capacitance of the lines, $C_m$ is the mutual capacitance of the lines, and $Z_0$ is the characteristic impedance of the system, usually 50Ω. Equations [1], [2], and [3] are generated from the basic conditions $S_{31}$=jC and $S_{41}$=0 using known standard coupled transmission line equations.

The coupler design problem involves Equations [1], [2] and [3] and five unknowns, so two of these parameters can be independently selected. Herein, θ and L are constrained by the available area which determines the length of the lines. The remaining three parameters k, $C_s$ and $C_m$ can be determined using Equations [1], [2] and [3], and the geometry of the structure (except its length) can be selected to realize these values.

Figure 1B:
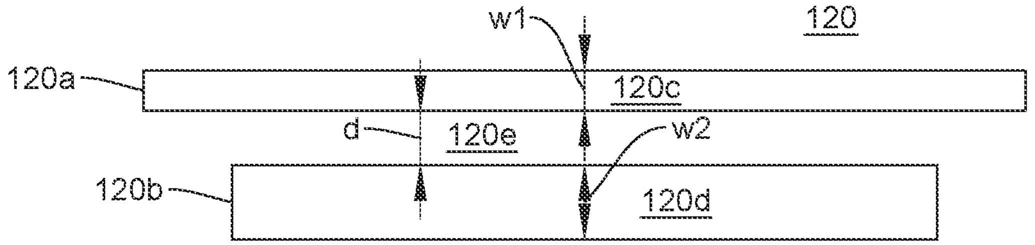
FIG. 1B (RELATED ART)
FIG. 1B illustrates a horizontally coupled structure, according to the prior art.
Figure 1C:
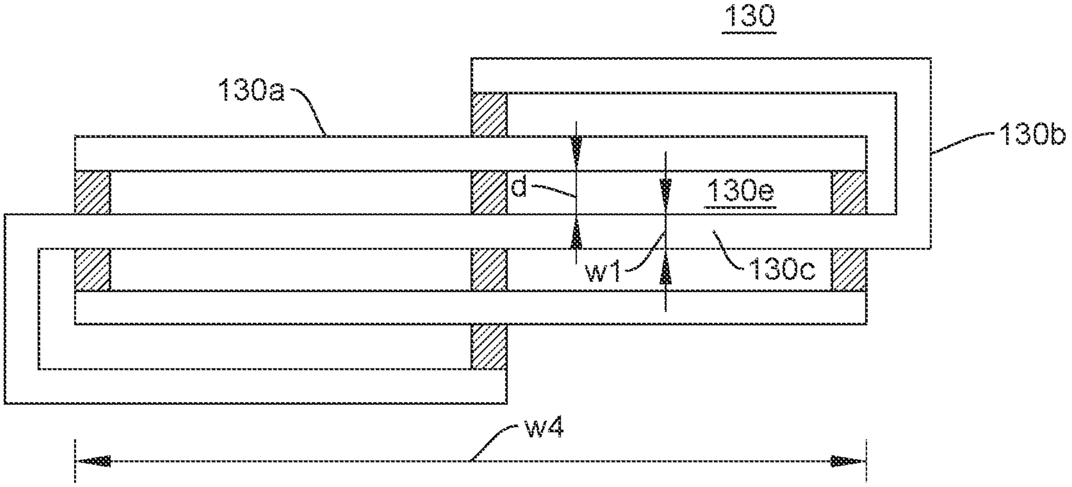
FIG. 1C (RELATED ART)
FIG. 1C illustrates a Lange coupler, according to the prior art.
Figure 1D:
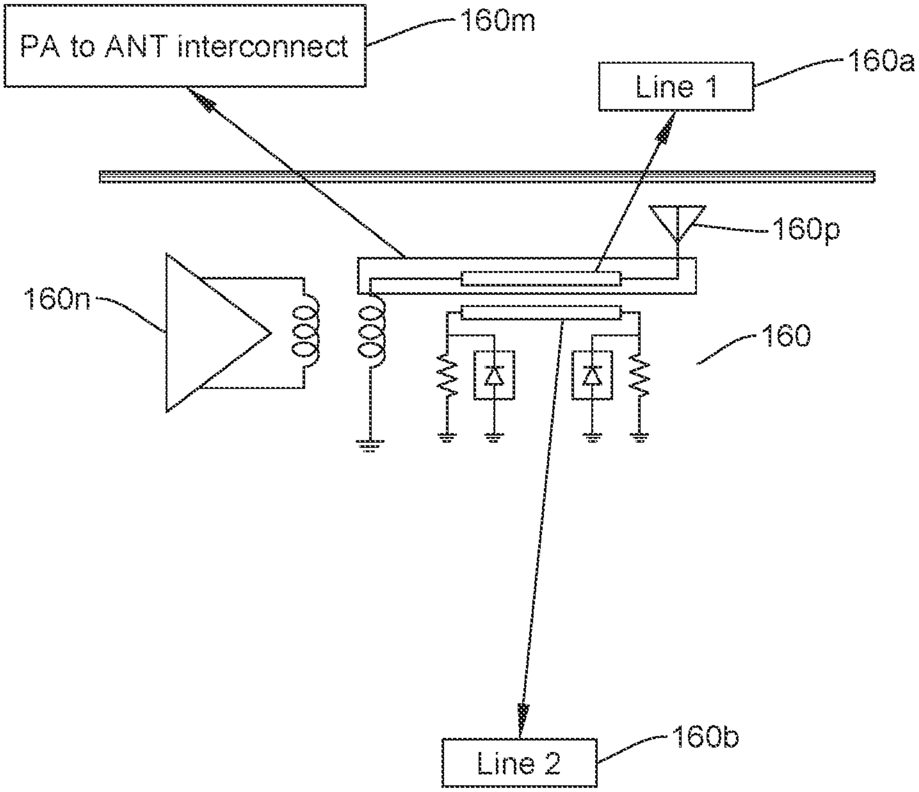
FIG. 1D illustrates an interconnect of a coupler structure in wireless device circuitry, to which the disclosure is applied.

FIG. 1A illustrates a vertically coupled structure 110 according to the prior art, FIG. 1B illustrates a horizontally coupled structure 120 according to the prior art, FIG. 1C illustrates a Lange coupler 130 according to the prior art, and FIG. 1D illustrates an interconnect 160*m* of a coupler structure in wireless device circuitry, to which the disclosure is applied.

As illustrated in FIGS. 1A and 1B, in the conventional vertically and horizontally coupled structures 110 and 120, Line 2 110*b*, 120*b* has a single section and does not have a split structure. In FIG. 1C, the Lange coupler includes both Line 1 (130*a*) and Line 2 (130*b*) being split and interdigitated. It is noted that the Lange coupler 130 in FIG. 1C is typically used for radio frequency (RF) power splitting/combining.

In the conventional vertically coupled structure 110 in FIG. 1A, adjusting the widths w1 (110*c*) and w2 (110*d*) of Line 1 (110*a*) and Line 2 (110*b*), respectively, impacts $C_s$ and $C_m$ together and also has some impact on L. Changing the metal layer of one of the lines impacts $C_s$, $C_m$, and k together.

In the conventional horizontally coupled structure 120 in FIG. 1B, changing the distance d (120*e*) between the lines affects both $C_m$ and k.

The present disclosure, therefore, provides a passive structure for four-port directional couplers that achieves improved independent control of the above-discussed parameters.

In FIG. 1D, it is shown that Line 1 (160*a*) of the coupler structure including Line 1 (160*a*) and Line 2 (160*b*) provides an interconnect 160*m* between a transmitter (Tx) 160*n* and an antenna 160*p* in the wireless device circuitry.

Figure 2A:
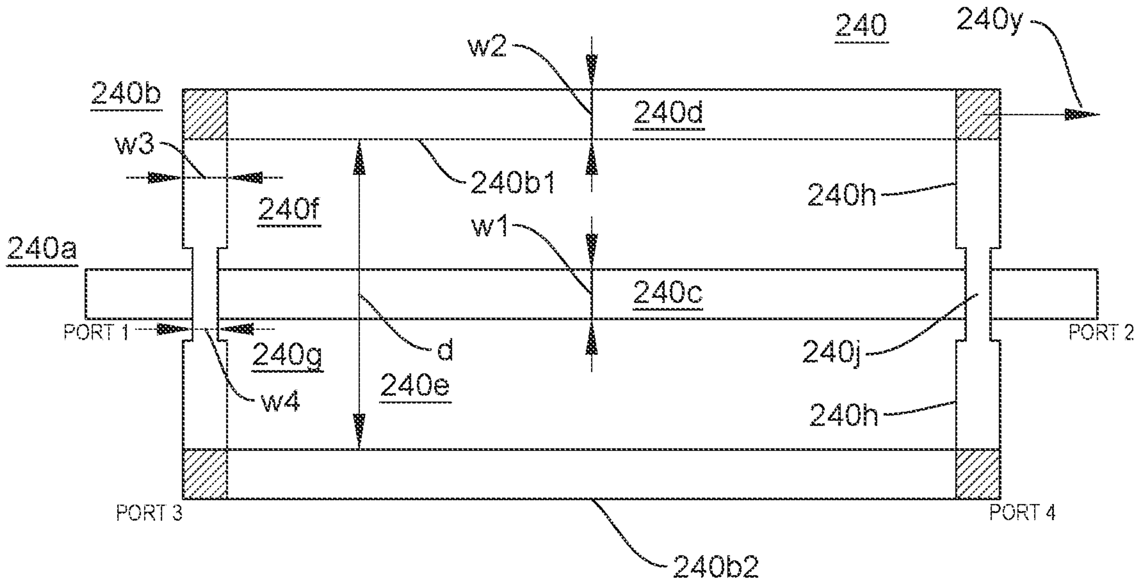
FIG. 2A illustrates a passive structure for a four-port directional coupler, according to a first embodiment.
Figure 2B:
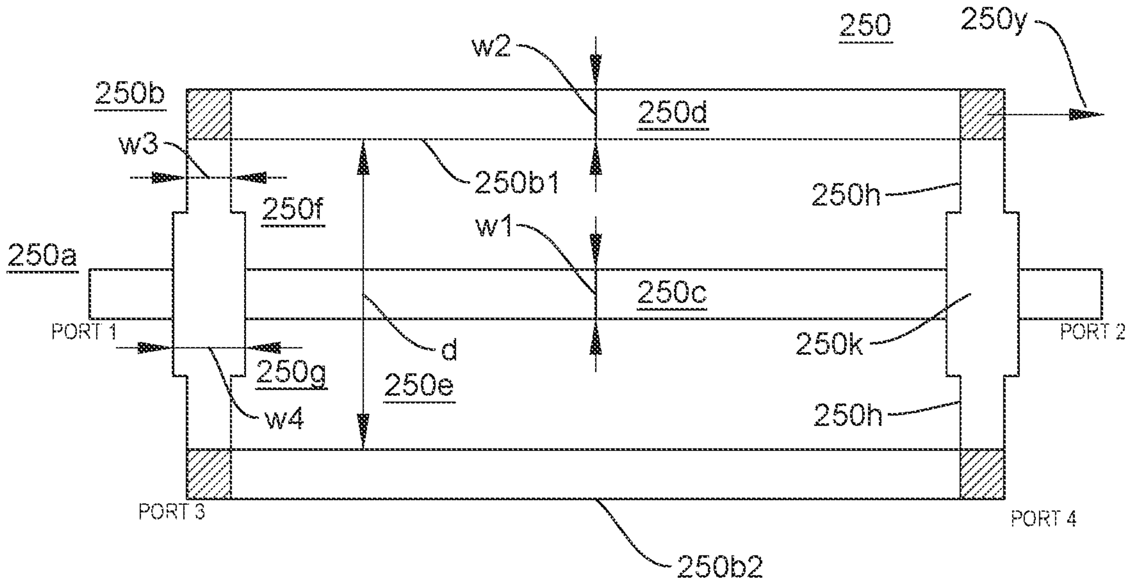
FIG. 2B illustrates a passive structure for a four-port directional coupler, according to a second embodiment.

FIG. 2A illustrates a passive structure 240 for a four-port directional coupler, according to a first embodiment, and FIG. 2B illustrates a passive structure 250 for a four-port directional coupler, according to a second embodiment. Specifically, FIGS. 2A and 2B illustrate top views of two different variants of the disclosed four-port directional coupler for use in an electronic device (501 in FIG. 5, for example). FIGS. 2A and 2B will be described together, as the coupler structures 240 and 250 are similar in some regards, though they may differ in other regards.

Referring to FIGS. 2A and 2B, the coupler structures 240 and 250 include two coupled metal lines (Line 1 (240*a*, 250*a*) and Line 2 (240*b*, 250*b*)) over a substrate. Line 1 (240*a*, 250*a*) is also a part of the interconnect between the transmitter and the antenna, to which antenna each of the coupler structures is electrically connected at an end of Line 2 (240*b*, 250*b*) by a via (240*y*, 250*y*). Line 2 (240*b*, 250*b*) is introduced to form a four-port directional coupler along with Line 1 (240*a*, 250*a*). Line 2 (240*b*, 250*b*) is split into two sections (240*b*1 and 240*b*2 in coupler 240 of FIG. 2A, 250*b*1 and 250*b*2 in coupler 250 of FIG. 2B) on either side of Line 1 (240*a*, 250*a*). The two sections 250*b*1, 250*b*2 of Line 2 (240*b*, 250*b*) are connected at the ends using bridges 240*h*, 250*h* in FIGS. 2A and 2B.

Line 1 (240*a*, 250*a*) and Line 2 (240*b*, 250*b*) can be in the same or different metal layers as dictated by the design process. Also, the bridges 240*h*, 250*h* can be in the same or different metal layer as Line 2 (240*b*, 250*b*). However, the bridge 240*h*, 250*h* should be in a different metal layer from Line 1 (240*a*, 250*a*). Alternatively, Line 2 (240*b*, 250*b*) and the bridge 240*h*, 250*h* may be disposed on a same separate metal layer from Line 1 (240*a*, 250*a*).

In the first embodiment in FIG. 2A, the bridge 240*h* has a notch 240*j* in the center of the coupler 240 that passes above or below Line 1 (240*a*), the notch 240*j* having a narrower width w4 (240*g*) than the width w3 (240*f*) of the bridge 240*h*, as illustrated. In the second embodiment in FIG. 2B, the bridge 250*h* has a bulge 250*k* in the center of the coupler 250 that passes above or below Line 1 (250*a*), the bulge 250*k* having a wider width w4 (250*g*) than the width w3 (250*f*) of the bridge 250*h*, as illustrated.

As noted above in FIGS. 2A and 2B, Line 2 (240*b*, 250*b*) is split into two sections. This contrasts with Line 2 (110*b*, 120*b*) of the conventional couplers 110, 120 in FIGS. 1A and 1B which do not have a split structure. In addition, Line 2 (240*b*, 250*b*) in FIGS. 2A and 2B is connected by bridges 240*h*, 250*h* at the ends, which do not exist in the conventional couplers 110, 120 in FIGS. 1A and 1B.

In FIGS. 2A and 2B, Line 1 (240*a*, 250*a*) and Line 2 (240*b*, 250*b*) can be in different metal layers. In contrast, Line 1 (130*a*) and Line 2 (130*b*) in the conventional Lange coupler 130 of FIG. 1C need to be in the same metal layer.

The coupler structures 240, 250 in FIGS. 2A and 2B can be used for couplers with length <<λ/4 and any desired coupling factor. The Lange coupler 130 of FIG. 1C, however, was primarily designed to achieve a high coupling factor (~3 dB) using multiple interdigitated sections. To achieve a low coupling factor as in the disclosed couplers, the lines in the Lange coupler 130 would have to be spaced significantly apart, thereby increasing the y-dimension and the overall area of the coupler.

In order to achieve a high directivity while maintaining a fixed coupling factor in an electrically small coupler (length <<λ/4), the coupled line parameters θ, L, k, $C_s$, $C_m$ are precise to specific values given by design equations. The disclosed coupler structures 240, 250 give higher flexibility to set these parameters independently of each other as compared to the conventional coupler structures 110, 120, and 130.

Adjusting the width w4 (240*g*) of the notch 240*j* of coupler structure 240 or the width w4 (250*g*) of the bulge 250*k* in the coupler structure 250 modifies $C_m$ only, without significantly impacting other parameters. In contrast, independent control of $C_m$ is not possible in the conventional structures 110, 120, and 130 illustrated in FIGS. 1A, 1B and 1C.

Furthermore, adjusting the width w3 (240*f*) of the bridge 240*h* of coupler structure 240 or the width w3 (250*f*) of the bridge 250*h* of coupler structure 250 allows for independent adjustment of $C_s$, which is not feasible in conventional structures illustrated in FIGS. 1A, 1B and 1C.

The disclosed couplers 240, 250 in FIGS. 2A and 2B can achieve a broader range of coupling factors compared to the conventional couplers 110, 120, and 130 illustrated in FIGS. 1A, 1B and 1C. Since Line 2 (240*b*, 250*b*) is split into two sections in the disclosed couplers (240*b*1 and 240*b*2 in coupler 240 of FIG. 2A, 250*b*1 and 250*b*2 in coupler 250 of FIG. 2B), higher magnetic and capacitive coupling factors are realized than in the conventional horizontal coupler 120 in FIG. 1B.

The notch 240*j* and bulge 250*k* in the bridges 240*h*, 250*h* in FIGS. 2A and 2B enable another degree of freedom to adjust the coupling factor, in further contrast with the conventional couplers.

Referring back to the conventional vertically coupled structure 110 in FIG. 1A, if w1 (110*c*) and w2 (110*d*) are chosen to set $C_s$, there are no other parameters to set $C_m$. Modifying the widths also has a minor impact on L. Changing the metal layer of one of the lines also impacts $C_sC_m$, and L together. Thus, there is no independent control over $C_s$, $C_m$, and L, and directivity cannot be fully optimized.

Referring back to the conventional horizontally coupled structure 120 in FIG. 1B, w1 (120*c*) and w2 (120*d*) may be used to set $C_s$. To modify $C_m$, the distance d (120*e*) between Line 1 (120*a*) and Line 2 (120*b*) may be changed, but this change impacts the magnetic coupling factor k. Hence, in this structure 120, the line parameters cannot be set independently, and consequently, optimum directivity is not available.

Using the structures 240, 250 of FIGS. 2A and 2B, θ and L are set by the length of the line as previously discussed. Distance d (240*e*, 250*e*), which is variable between the lines (w1, w2) can be used to achieve the desired value of k. The widths of each of the lines (w1, w2) in couplers 240, 250 can be chosen to set $C_s$. If changing the width impacts L significantly, then $C_s$ can be tuned by adjusting the width w3 (240*f*, 250*f*) of the bridge 240*h*, 250*h* or by changing the metal layer (i.e., the vertical distance of the coupler structure from the substrate) of the bridge 240*h*, 250*h*. $C_m$ can be adjusted by changing the width w4 (240*g*, 250*g*) of the notch 240*j* or the bulge 250*k* in the bridge 240*h*, 250*h*. Thus, in the structures 240, 250 of FIGS. 2A and 2B, it is possible to set all five coupled line parameters independently, thereby enabling full optimization of the directivity of the coupler.

Figure 3A:
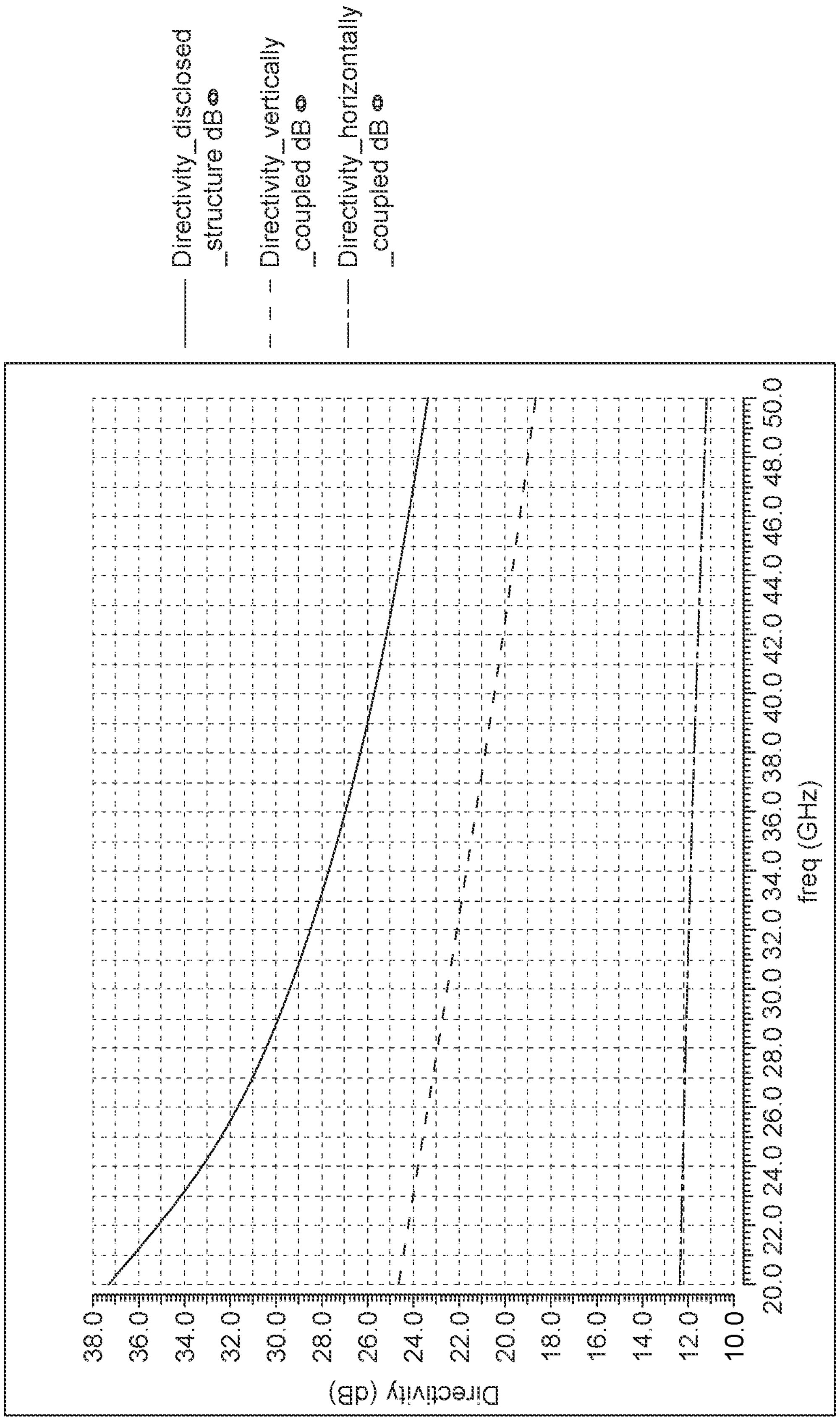
FIG. 3A illustrates simulation results of the directivity of the conventional couplers 110 and 120 and the disclosed coupler, according to an embodiment.
Figure 3B:
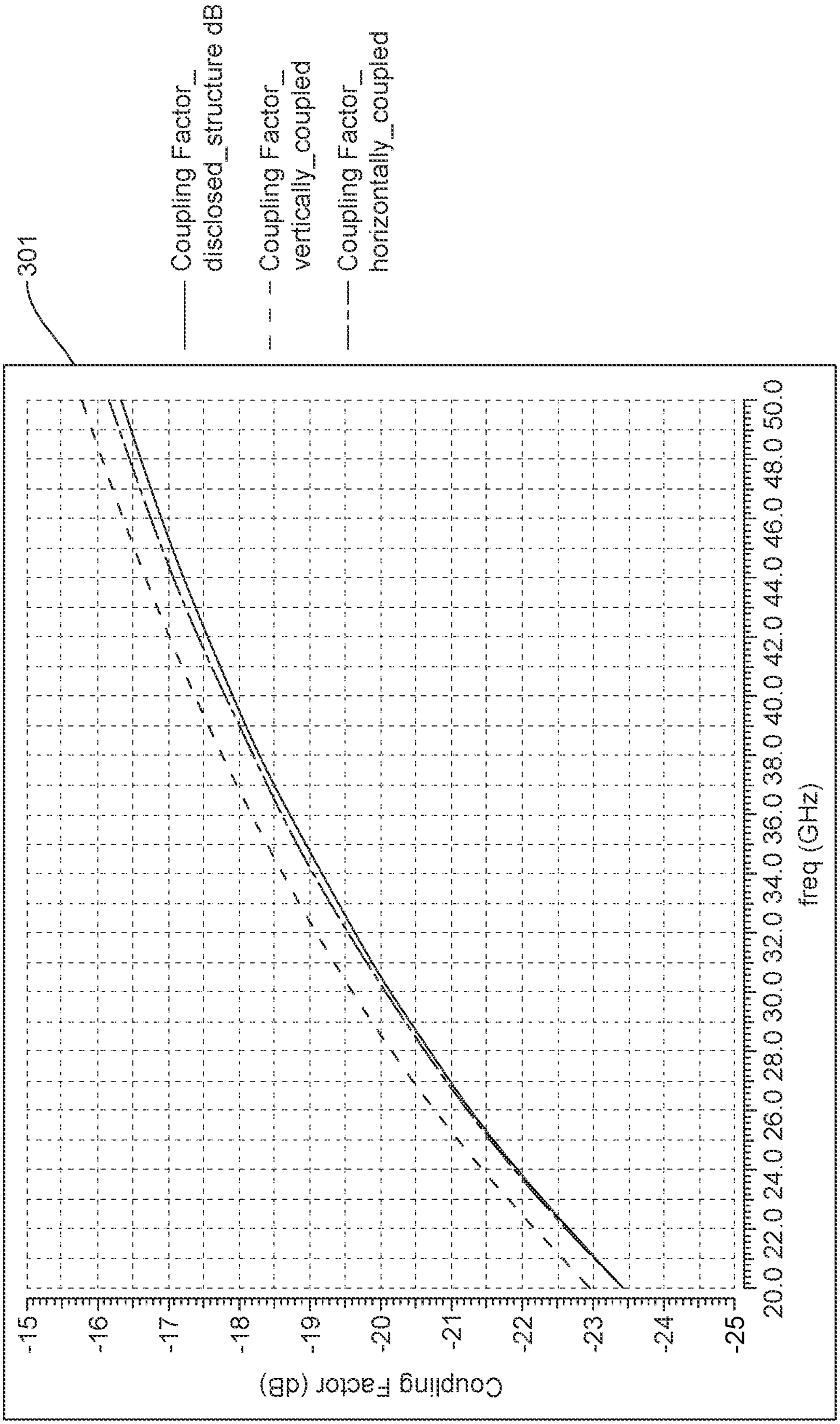
FIG. 3B illustrates simulation results of the coupling factor of the conventional couplers 110 and 120 and the disclosed coupler, according to an embodiment.

FIG. 3A illustrates simulation results 300 of the directivity of the conventional couplers 110 and 120 and the disclosed coupler, according to an embodiment. FIG. 3B illustrates simulation results 301 of the coupling factor of the conventional couplers 110 and 120 and the disclosed coupler, according to an embodiment. That is, simulation results 300 and 301 of the three types of coupler structures in a given device technology are illustrated in FIGS. 3A and 3B.

In the simulations, all coupler structures have the same length and coupling factor, and the rest of the geometry of the couplers was optimized to maximize the directivity. As can be observed, the disclosed coupler structures 240 and 250 of FIGS. 2A and 2B improve directivity in comparison to the conventional coupler by 5-8 dB in the 24-40 gigahertz (GHz) frequency range.

Figure 4:
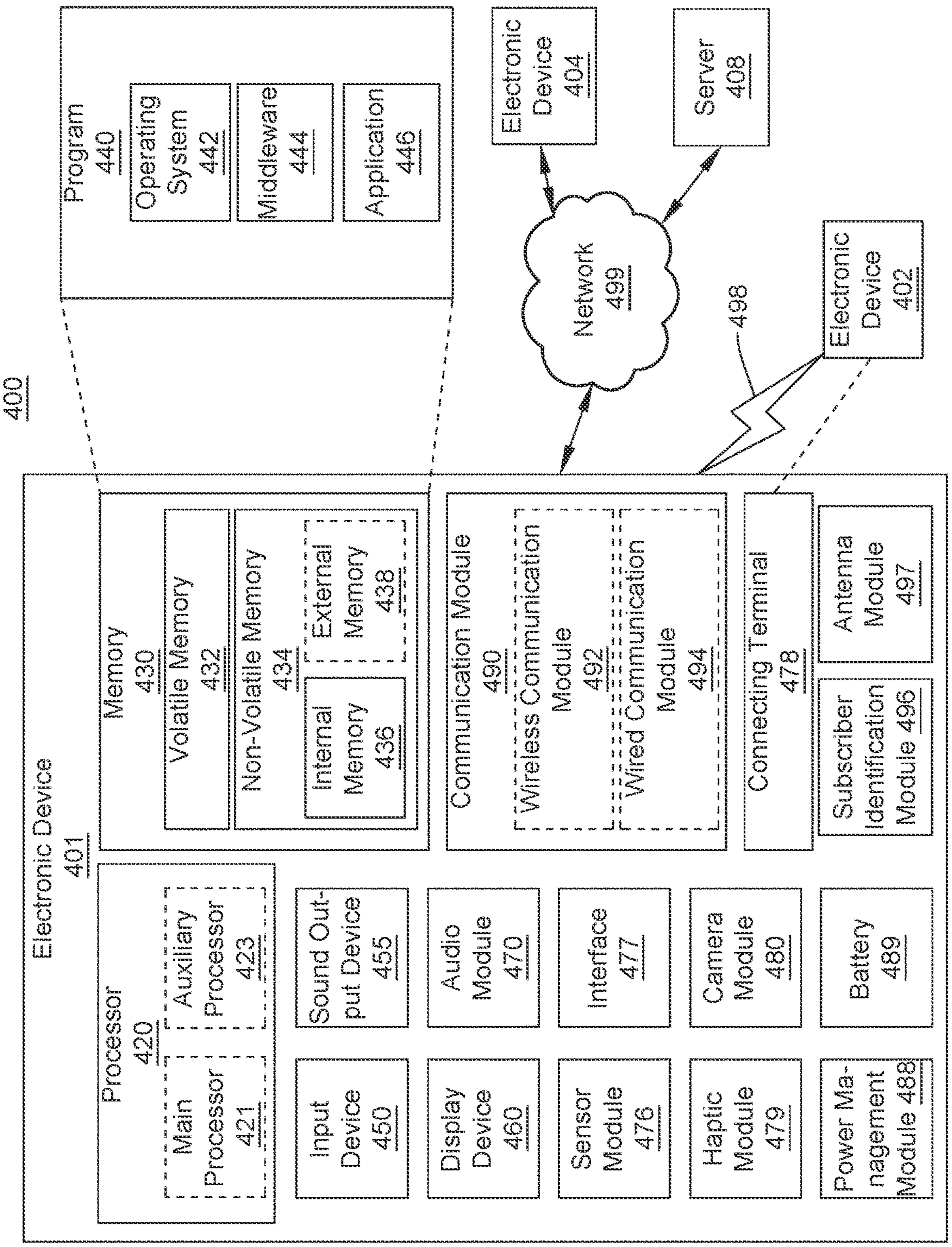
FIG. 4 is a block diagram of an electronic device in a network environment according to an embodiment.

FIG. 4 is a block diagram of an electronic device in a network environment, according to an embodiment. Referring to FIG. 4, an electronic device 401 in a network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 508. The electronic device 401 may include a processor 420, a memory 430, an input device 440, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 494. In one embodiment, at least one (e.g., the display device 460 or the camera module 480) of the components may be omitted from the electronic device 401, or one or more other components may be added to the electronic device 401. Some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420 and may perform various data processing or computations. As at least part of the data processing or computations, the processor 420 may load a command or data received from another component (e.g., the sensor module 446 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). The auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 542, middleware 444, or an application 446.

The input device 450 may receive a command or data to be used by another component (e.g., the processor 420) of the electronic device 401, from the outside (e.g., a user) of the electronic device 501. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. The display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. The audio module 470 may obtain the sound via the input device 450 or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. The interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. The connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. The haptic module 479 may include, for example, a motor, a piezoelectric element, or an electrical stimulator.

The camera module 480 may capture a still image or moving images. The camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. The battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. The communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 701. The antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. A device, comprising:

a first line;

a second line including a first section disposed on a first side of the first line and a second section disposed on a second side of the first line, the second side being opposite to the first side and the second section being separate from the first section by a distance; and at least one bridge electrically connecting an end of the first section with an end of the second section and extending across the first line, wherein a width of the first line and a width of the first section and the second section of the second line are set to modify one of a plurality of coupled line parameters.

2. The device of claim 1, wherein the at least one bridge includes a notch, and wherein a width of the notch is narrower than a width of the at least one bridge and is set to modify one of a plurality of coupled line parameters including an electrical length of the first and second lines, a self-inductance of the first and second lines, a magnetic coupling factor between the first and second lines, a self-capacitance of the first and second lines, and a mutual capacitance of the first and second lines.

3. The device of claim 1, wherein the at least one bridge includes a bulge, and wherein a width of the bulge is wider than a width of a remainder of the at least one bridge and is set to modify one of a plurality of coupled line parameters including an electrical length of the first and second lines, a self-inductance of the first and second lines, a magnetic coupling factor between the first and second lines, a self-capacitance of the first and second lines, and a mutual capacitance of the first and second lines.

4. The device of claim 1, wherein the plurality of coupled line parameters includes an electrical length of the first and second lines, a self-inductance of the first and second lines, a magnetic coupling factor between the first and second lines, a self-capacitance of the first and second lines, and a mutual capacitance of the first and second lines.

5. The device of claim 1, further comprising:

a transmitter; and an antenna, wherein the first line, the second line, and the at least one bridge are electrically connected to the transmitter on a first end and to the antenna by a via on a second end opposite to the first end.

6. The device of claim 5, wherein each of the first line and the second line is disposed on a metal layer, and wherein the metal layer on which the first line is disposed is identical to or different than the metal layer on which the second line is disposed.

7. An electronic device, comprising:

an antenna; and a directional coupler electrically connected to the antenna, the directional coupler including:

a first line;

a second line including a first section disposed above the first line and a second section disposed beneath the first line, the second section being separate from the first section by a distance; and at least one bridge electrically connecting an end of the first section with an end of the second section by extending above or below the first line, wherein a width of the first line and a width of the first section and the second section of the second line are set to modify one of a plurality of coupled line parameters.

8. The electronic device of claim 7, further comprising a transmitter, wherein the directional coupler is electrically connected to the transmitter on a first end and to an antenna by a via on a second end opposite to the first end.

9. The electronic device of claim 7, wherein the at least one bridge includes a notch, and wherein a width of the notch is narrower than a width of a remainder of the at least one bridge and is set to modify one of a plurality of coupled line parameters including an electrical length of the first and second lines, a self-inductance of the first and second lines, a magnetic coupling factor between the first and second lines, a self-capacitance of the first and second lines, and a mutual capacitance of the first and second lines.

10. The electronic device of claim 7, wherein the at least one bridge includes a bulge, and wherein a width of the bulge is wider than the width of a remainder of the at least one bridge and is set to modify one of a plurality of coupled line parameters including an electrical length of the first and second lines, a self-inductance of the first and second lines, a magnetic coupling factor between the first and second lines, a self-capacitance of the first and second lines, and a mutual capacitance of the first and second lines.

11. The electronic device of claim 7, wherein the plurality of coupled line parameters includes an electrical length of the first and second lines, a self-inductance of the first and second lines, a magnetic coupling factor between the first and second lines, a self-capacitance of the first and second lines, and a mutual capacitance of the first and second lines.

12. The electronic device of claim 7, wherein each of the first line and the second line is disposed on a metal layer, and wherein the metal layer on which the first line is disposed is identical to or different than the metal layer on which the second line is disposed.

13. A device, comprising:

a transmitter;

an antenna;

a first line;

a second line including a first section disposed on a first side of the first line and a second section disposed on a second side of the first line, the second side being opposite to the first side and the second section being separate from the first section by a distance; and at least one bridge electrically connecting an end of the first section with an end of the second section, wherein the first line, the second line, and the at least one bridge are electrically connected to the transmitter on a first end and to the antenna by a via on a second end opposite to the first end, and wherein a width of the first line and a width of the first section and the second section of the second line are set to modify one of a plurality of coupled line parameters.

14. The device of claim 13, wherein the at least one bridge includes a notch, and wherein a width of the notch is narrower than a width of the at least one bridge and is set to modify one of a plurality of coupled line parameters including an electrical length of the first and second lines, a self-inductance of the first and second lines, a magnetic coupling factor between the first and second lines, a self-capacitance of the first and second lines, and a mutual capacitance of the first and second lines.

15. The device of claim 13, wherein the at least one bridge includes a bulge, and wherein a width of the bulge is wider than a width of a remainder of the at least one bridge and is set to modify one of a plurality of coupled line parameters including an electrical length of the first and second lines, a self-inductance of the first and second lines, a magnetic coupling factor between the first and second lines, a self-capacitance of the first and second lines, and a mutual capacitance of the first and second lines.

16. The device of claim 13, wherein the plurality of coupled line parameters includes an electrical length of the first and second lines, a self-inductance of the first and second lines, a magnetic coupling factor between the first and second lines, a self-capacitance of the first and second lines, and a mutual capacitance of the first and second lines.

17. The device of claim 13, wherein each of the first line and the second line is disposed on a metal layer.

18. The device of claim 13, wherein the metal layer on which the first line is disposed is identical to or different than the metal layer on which the second line is disposed.

* * * * *